(12) United States Patent
Burdick, Jr. et al.

(10) Patent No.: US 7,564,125 B2
(45) Date of Patent: Jul. 21, 2009

(54) ELECTRONIC ARRAY AND METHODS FOR FABRICATING SAME

(75) Inventors: William E. Burdick, Jr., Niskayuna, NY (US); James W. Rose, Guilderland, NY (US); Donna M. Sherman, East Greenbush, NY (US); James E. Sabatini, Scotia, NY (US); George Edward Possin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 432 days.

(21) Appl. No.: 10/313,078

(22) Filed: Dec. 6, 2002

(65) Prior Publication Data

US 2004/0109299 A1   Jun. 10, 2004

(51) Int. Cl.
*H01L 23/02* (2006.01)
(52) U.S. Cl. ............... 257/678; 257/680; 257/685; 257/E23.001; 257/433
(58) Field of Classification Search ................ 257/292, 257/291, 691, 433, 686, 678, 680, 685, E23.001; 361/789
See application file for complete search history.

(56) References Cited

U.S. PATENT DOCUMENTS

| | | | | |
|---|---|---|---|---|
| 4,663,652 A | * | 5/1987 | Nishizawa | 257/782 |
| 4,798,541 A | * | 1/1989 | Porter | 439/67 |
| 5,060,651 A | * | 10/1991 | Kondo et al. | 600/443 |
| 5,267,221 A | * | 11/1993 | Miller et al. | 367/140 |
| 5,464,984 A | | 11/1995 | Cox et al. | |
| 5,477,075 A | * | 12/1995 | Forrest et al. | 257/433 |
| 5,545,429 A | | 8/1996 | Booth et al. | |
| 5,854,534 A | * | 12/1998 | Beilin et al. | 257/691 |
| 5,907,178 A | * | 5/1999 | Baker et al. | 257/433 |
| 6,234,820 B1 | | 5/2001 | Perino et al. | |
| 6,251,507 B1 | | 6/2001 | Yamamoto et al. | |
| 6,279,399 B1 | * | 8/2001 | Holm | 73/626 |
| 6,328,427 B1 | | 12/2001 | Watanabe et al. | |
| 6,426,991 B1 | * | 7/2002 | Mattson et al. | 378/19 |
| 2002/0030261 A1 | * | 3/2002 | Rolda et al. | 257/685 |
| 2002/0081869 A1 | * | 6/2002 | Abbott | 439/66 |
| 2007/0085088 A1 | * | 4/2007 | Sekine et al. | 257/80 |

FOREIGN PATENT DOCUMENTS

EP  0 473 125 A2   3/1992
WO  WO 02/054955   7/2002

* cited by examiner

*Primary Examiner*—Walter L Lindsay, Jr.
*Assistant Examiner*—Ron E Pompey
(74) *Attorney, Agent, or Firm*—Armstrong Teasdale LLP

(57) ABSTRACT

A sensor array includes a substrate including a front side and a back side, a plurality of transducers fabricated on the front side of the substrate, a plurality of input/output connections positioned on the back side of the substrate, the input/output connections electrically coupled to the transducers, at least one electronic device, and an interposer positioned between the substrate and the electronic device, the interposer including a multilayer interconnect system configured to electrically connect the input/output connections to the electronic device.

6 Claims, 6 Drawing Sheets

ELECTRONIC ARRAY AND METHODS FOR FABRICATING SAME

BACKGROUND OF THE INVENTION

This invention relates generally to electronic arrays, and more particularly, to methods for fabricating an electronic sensor array.

Electronic sensors and transmitters are often configured in arrays to transmit or receive data in a two dimensional format or to effect a desired resolution for a given area. For example, at least one known sensor includes a photodiode including an array of photosensitive pixels coupled to a scintillating medium, which can also be configured as an array of scintillator cells. When subjected to x-ray energy, the scintillator generates optical photons which in turn excite the underlying photosensitive pixels within the photodiode thereby producing an electrical signal corresponding to an incident photon flux.

In fabricating a sensor, a plurality of bond pads are fabricated to provide for electrical connection to the desired sensor or transmitter. Generally, these bond pads are located on one or more of the sides of the top surface of the sensor, i.e., the sensor surface that includes the active region or elements. For the particular case of an x-ray sensor, the bond pads are often located on two opposing sides of the top surface of the sensor. Accordingly, when a plurality of individual sensors are assembled into a single, linear composite array, the location of the bond pads effect a region of interconnect on two sides of the array. Accordingly, these interconnect regions prevent configuring sensors into continuous two-dimensional arrays.

BRIEF DESCRIPTION OF THE INVENTION

In one aspect, a tileable sensor array is provided. The tileable sensor array includes a substrate including a front side and a back side, a plurality of transducers fabricated on the front side of the substrate, a plurality of input/output connections positioned on the back side of the substrate, the input/output connections electrically coupled to the transducers, at least one electronic device, and an interposer positioned between the substrate and the electronic device, the interposer including a multilayer interconnect system configured to electrically connect the input/output connections to the electronic device.

In another aspect, a tileable sensor array kit is provided. The kit includes an interchangeable sensor array, at least one removable signal processor circuit, and a first flexible interchangeable multilayer interconnect system positioned between the interchangeable transistor array and the signal processor circuit, and a second flexible interchangeable multilayer interconnect system positioned between the interchangeable transistor array and the signal processor circuit; the first multilayer interconnect system configured differently than the second multilayer interconnect system.

In a further aspect, a method for fabricating a tileable sensor array is provided. The method includes fabricating a plurality of transducers on a front side of a substrate, fabricating a plurality of input/output connections on a back side of the substrate, such that the input/output connections are electrically coupled to the transducers, and positioning an interposer between the substrate and an electronic device; wherein the interposer comprises a multilayer interconnect system configured to electrically connect the input/output connections to the electronic device.

In still another aspect, a tileable sensor array kit is provided. The kit includes a first interchangeable substrate including a plurality of sensors, a second interchangeable substrate including a plurality of transmitters, a flexible interchangeable multilayer interconnect system positioned between at least one of the interchangeable substrate and the second interchangeable substrate, and at least one removable signal processor circuit.

DETAILED DESCRIPTION OF THE INVENTION

Figure 1:
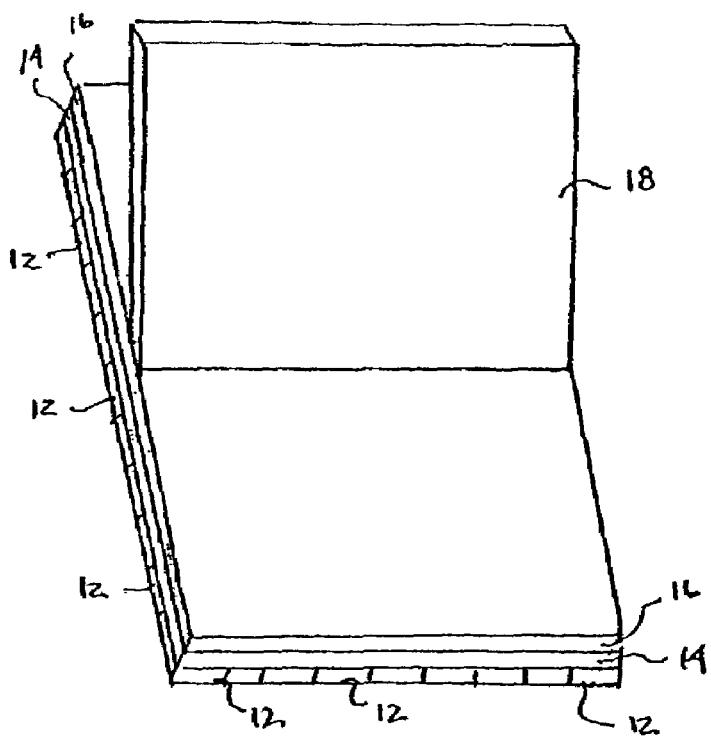
FIG. 1 is a portion of a schematic illustration of an exemplary tileable sensor/transmitter array.
Figure 2:
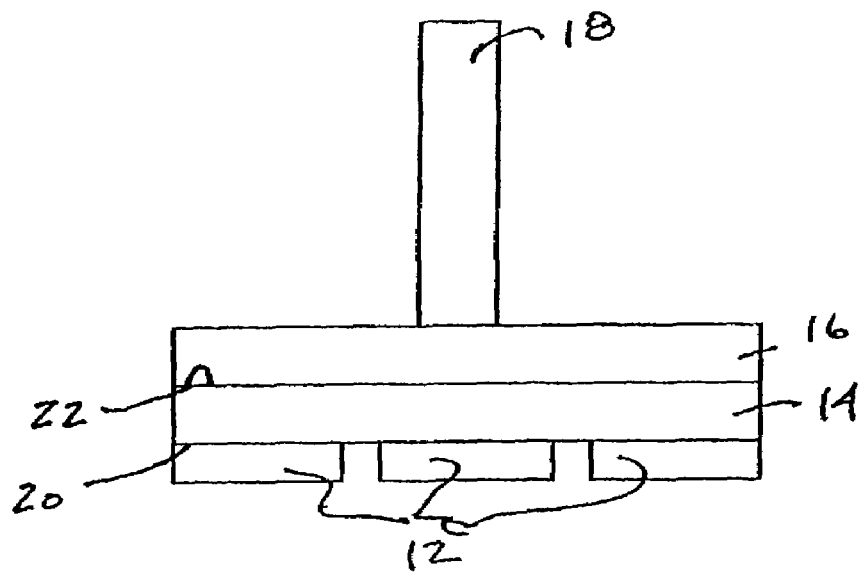
FIG. 2 is a side view of a portion of the transducer array shown in FIG. 1.

FIG. 1 is a portion of a schematic illustration of an exemplary tileable sensor array 10 that can be used with a system, such as, but not limited to a computed tomography imaging system, a magnetic resonance imaging system, a Positron Emission Tomography (PET) system, and a multi-energy computed tomography imaging system. FIG. 2 is a side view of a portion of sensor array 10 shown in FIG. 1. Transducer, as used herein, describes a device for converting at least one of a sound, a temperature, a pressure, a light or other signal to or from an electronic signal. In an exemplary embodiment, sensor array 10 includes a plurality of transducers 12 configured to receive an input signal and transmit a desired electrical output signal. For example, transducer array 10 includes a plurality of sensor devices, such as, but not limited to, a photodiode, a back-illuminated photodiode, a sonic sensor, i.e. a sensor configured to detect sounds, a temperature sensor, and an electromagnetic radiation sensor.

In an exemplary embodiment, sensor array 10 includes a plurality of transducers 12 fabricated on a substrate 14. In one embodiment, sensor array 10 includes an interposer 16, and an electronic device 18, electrically coupled to interposer 16. In another embodiment, electronic device 18 is electrically coupled to substrate 14 without using interposer 16. In an exemplary embodiment, transducers 12 are fabricated on a first side 20 of substrate 14 and at least one of interposer 16 and electronic device 18 are electrically coupled to a second side 22 of substrate 14.

Figure 3:
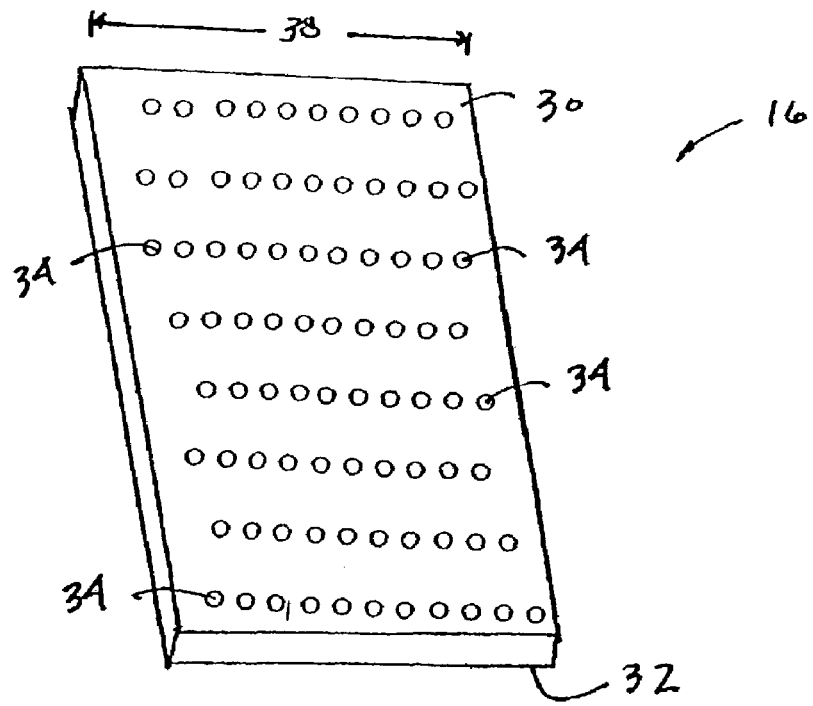
FIG. 3 is a perspective view of a first side of an interposer.
Figure 4:
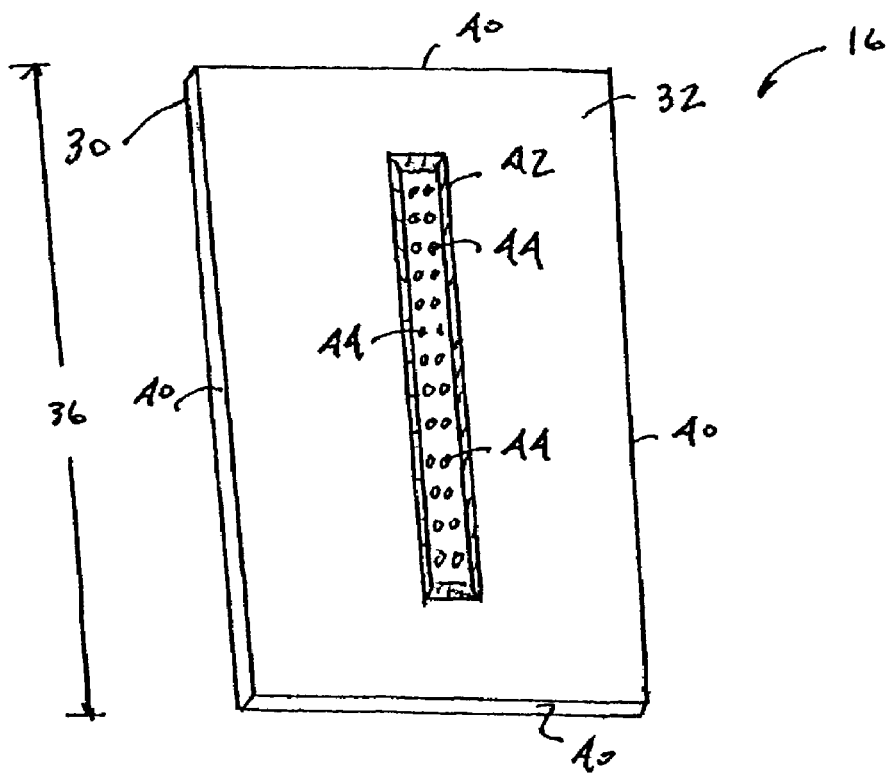
FIG. 4 is a perspective view of a second side of the interposer shown in FIG. 3.

FIG. 3 is a perspective view of a first side 30 of interposer 16. FIG. 4 is a perspective view of a second side 32 of interposer 16. Interposer first side 30 includes a plurality of input/output (I/O) connectors 34. In an exemplary embodiment, substrate 14 includes a plurality of I/O connectors (not shown) arranged such that an electrical connection is made between a desired I/O connector 34 on interposer first side 30, and a corresponding desired I/O connector positioned on substrate second side 22. Accordingly, substrate second side 22 is electrically coupled to interposer first side 30 using I/O connectors 34 and the I/O connectors positioned on substrate second side 22. Interposer 16 also includes a length 36 and a width 38. In one embodiment, length 36 and a width 38 are approximately equal to a length and width of substrate 14. In another embodiment, length 36 and a width 38 are less than a length and width of substrate 14 thereby providing maximum density of sensor arrays and clearance for subsequent assembly processes. In one embodiment, interposer second side 32 includes at least one electrical connector or socket 42. Socket 42 includes a plurality of input/output connectors 44, wherein each electrical connector 44 is electrically coupled to at least one electrical connector 34 on interposer first side 30. In an exemplary embodiment, interposer 16 includes a multilayer interconnect system including a plurality of input/output connectors on first side 30 electrically coupled to input/output connectors 44 on interposer second side 32 such that when an electrical signal is received at either input/output connectors 34 or 44, the electrical signal is passed to a corresponding input/output connector 34 or 44 on the opposite side of the interconnect system 16.

In one embodiment, input/output connectors 34 are permanently coupled to corresponding I/O connections positioned on substrate 14 using at least one of the attach methods of solder, an anisotropic conductive film (ACF) or paste (ACP), an ultrasonic bonding, a thermosonic bonding, and a thermocompression bonding. In another embodiment, input/output connectors 34 are removably coupled to corresponding I/O connections positioned on substrate 14 using a temporary connection, such as, but not limited to, a thermoplastic adhesive including embedded conductive contacts, a plurality of carbon nanofibers/tube, a low temperature solder, an elastomeric connector, and a metal plated or bumped flex.

In one embodiment, interposer 16 is a flexible interconnect fabricated from a material such as, but not limited to, metal-on-polyimide, an aramid, a fluorocarbon, and a polyester. Fabricating interposer 16 from a flexible material facilitates utilization of a minimum of geometry/features and multilayer, metal interconnects.

Figure 5:
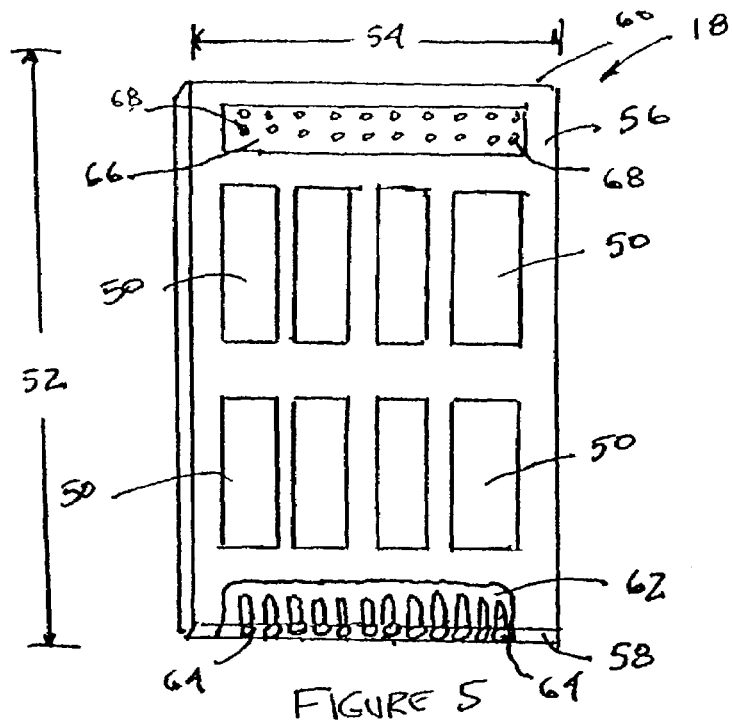
FIG. 5 is a perspective view of an electronic device.

FIG. 5 is a perspective view of electronic device 18. In an exemplary embodiment, electronic device 18 includes a plurality of signal processing circuits 50. Electronic device 18 also includes a length 52, a width 54, a first side 56, a first edge 58, and a second edge 60. In one embodiment, first edge 58 includes an electrical connector 62, including a plurality of input/output connectors 64 configured to electrically couple to associated input/output connectors 44 in socket 42. Electronic device 18 also includes an electrical connector 66 positioned on first side 56. In an exemplary embodiment, electrical connector 62 is implemented using a flexible printed circuit. Electrical connector 66 includes a plurality of input/output connectors 68 configured to electrically couple to associated input/output connectors 64, through circuits 50, on electronic device 18. In an exemplary embodiment, electronic device 18 and interposer 16 are removably coupled using socket 42 and electrical connector 62. In another embodiment, electronic device 18 is permanently coupled to interposer 16. In one embodiment, electronic device 18 is coupled to interposer 16 such that electronic device 18 is substantially orthogonal to interposer 16. Electronic device 18 also includes a flexible circuit (not shown) electrically coupled to electrical connector 66. In an exemplary embodiment, the flexible circuit is a flexible electrical cable including a plurality of electrical conductors, such as, but not limited to, a flexible ribbon cable.

Figure 6:
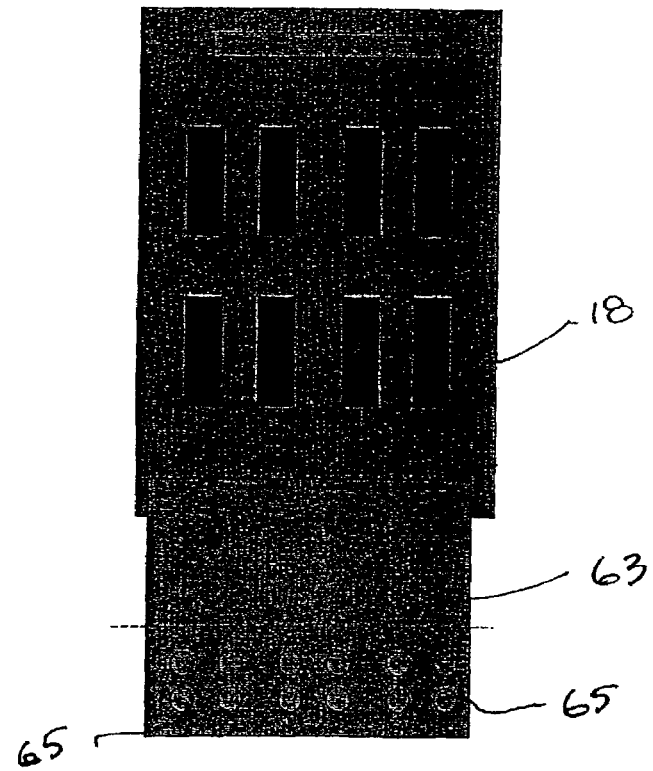
FIG. 6 is a perspective view of an alternate embodiment of the electronic device shown in FIG. 5.

FIG. 6 is a perspective view of an alternate embodiment of an electronic device 18 including an electrical connector 63 including a flexible printed circuit (not shown) that extends beyond first edge 58. Flexible circuit 63 includes a plurality of input/output connectors 65 configured to electrically couple to associated input/output connectors positioned on substrate second side 22. In this embodiment interposer 16 has been eliminated.

Figure 7:
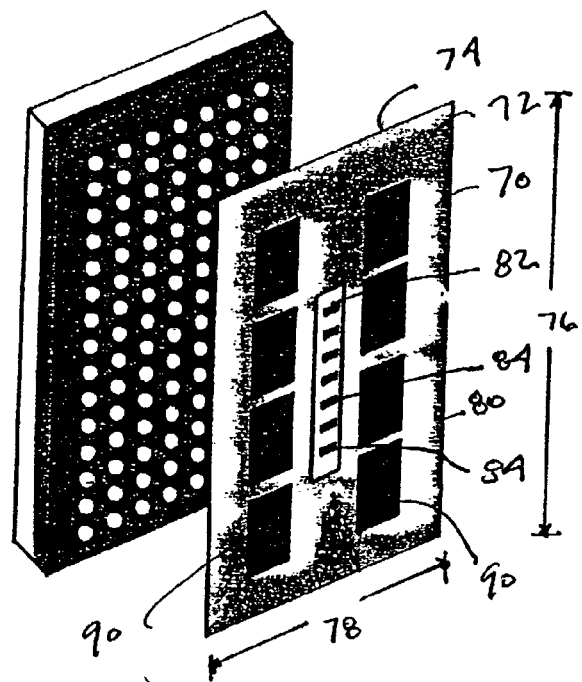
FIG. 7 is a perspective view of an interposer.

FIG. 7 is a perspective view of a rigid interposer 70. Interposer 70 includes a first side 72 and a second side 74. Interposer first side 72 includes a plurality of input/output (I/O) connectors (not shown) arranged such that an electrical connection is made between the desired I/O connector, on interposer first side 70, to the desired I/O connector on substrate second side 22. Accordingly, substrate second side 22 is electrically coupled to interposer first side 72 using the I/O connectors positioned on interposer 70 and the I/O connectors positioned on substrate second side 22. Interposer 70 also includes a length 76 and a width 78. In one embodiment, length 76 and a width 78 are approximately equal to a length and width of substrate 14. In another embodiment, length 76 and a width 78 are less than a length and width of substrate 14 thereby providing maximum density of sensor arrays and clearance for subsequent assembly processes Interposer first side 72 includes at least one electrical connector or socket 82. Socket 82 includes a plurality of input/output connectors 84, wherein each electrical connector 84 is electrically coupled to at least one electrical connector on interposer first side 72, i.e. interposer 70 is a multilayer interconnect system including a plurality of input/output connectors on first side 72 electrically coupled to the input/output connectors positioned on substrate second side 22 such that when an electrical signal is received at either the input/output connectors on interposer 70 or the input/output connectors on substrate second side 22, the electrical signal is passed to a corresponding input/output connector on the opposite side of interposer 70. In one embodiment, interposer 70 includes a plurality of signal processing circuits 90 positioned approximately parallel to interposer first side 72.

In one embodiment, the input/output connectors on interposer second side 74 are permanently coupled to the corresponding I/O connections positioned on substrate 14 using at least one of the attach methods of solder, an anisotropic conductive film (ACF) or a paste (ACP), an ultrasonic bonding, a thermosonic bonding, and a thermocompression bonding. In another embodiment, the input/output connectors on interposer second side 74 are removably coupled to corresponding I/O connections positioned on substrate 14 using a temporary connection, such as, but not limited to, a thermoplastic adhesive including embedded conductive contacts, a plurality of carbon nanofibers/tube, a low temperature solder, an elastomeric connector, and a metal plated or bumped flex.

Figure 8:
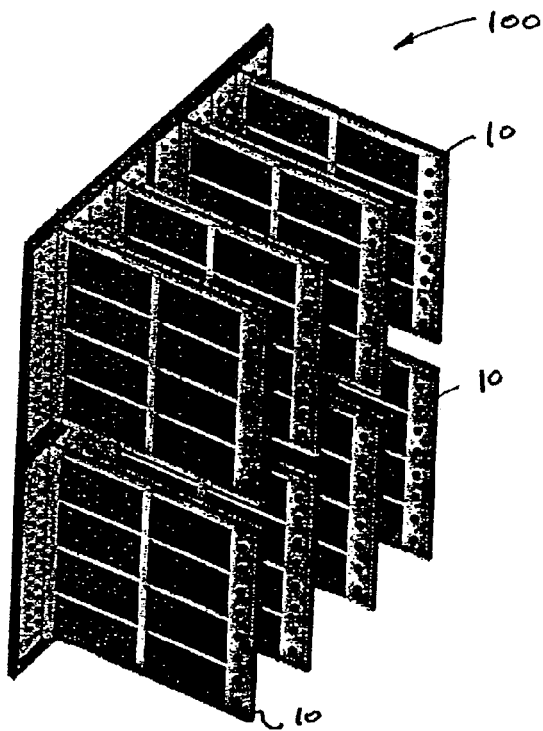
FIG. 8 is a pictorial view of a plurality of a sensor/transmitter arrays.

FIG. 8 is a pictorial view of a sensor array 100 including a plurality of sensors 10. As shown, sensors 10 are arranged in a two-dimensional array. In an exemplary embodiment, sensor array 100 can be configured to any size or dimension, relative to the quantity and arrangement of rows and columns of individual sensors, thus providing for desired structures compatible with applications in imaging or characterizing desired physical areas or volumes of physical objects, energy fields, image resolution, etc. One exemplary embodiment of a sensor array is a two dimensional configuration structured to approximate a curved surface.

Figure 9:
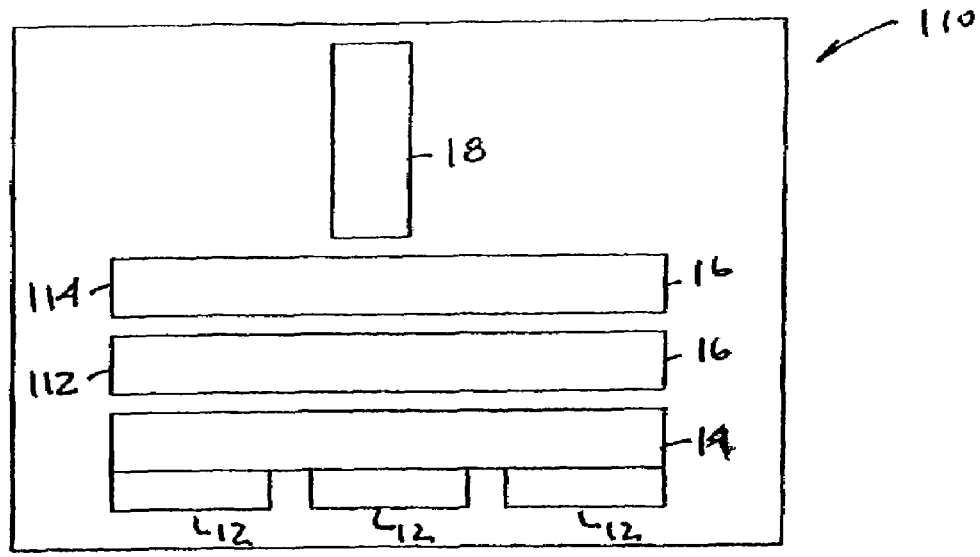
FIG. 9 is a top plan view of a first transducer array kit.

FIG. 9 is a top plan view of a sensor array kit 110. In an exemplary embodiment, sensor array kit 110 includes a plurality of transducers 12 fabricated on a substrate 14, and a plurality of flexible interposers 16. In an exemplary embodiment, interposers 16 include a first interposer 112 and a second interposer 114, wherein first interposer 112 is interchangeable with second interposer 114. Additionally, first interposer 112 includes a first multilayer interconnect system and second interposer 114 includes a second multilayer interconnect system configured differently than the first multilayer interconnect system. For example, interposer 112 and interposer 114 include the same input/output connections to couple to substrate 14 and electronic device 18, but the multilayer interconnect system includes different wiring configurations. Sensor array kit 110 also includes an electronic device 18, such as but not limited to a signal processor circuit, configured to removably couple to at least one of substrate 14 and interposers 16.

Figure 10:
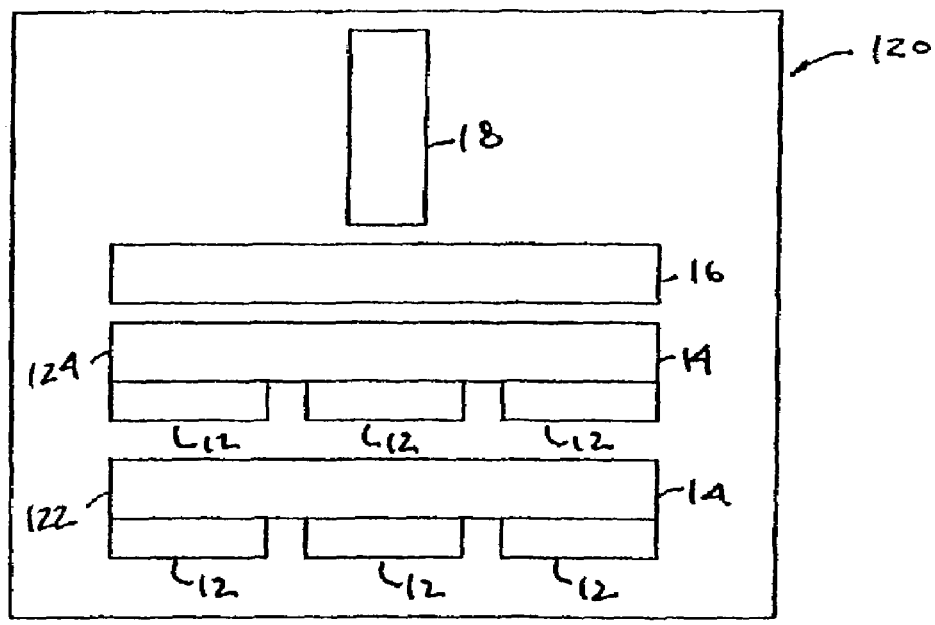
FIG. 10 is a top plan view of a second transducer array kit.

FIG. 10 is a top plan view of a sensor array kit 120. In an exemplary embodiment, sensor array kit 110 includes a plurality of substrates 14 including a plurality of transducers 12 fabricated on a substrate 14, and a flexible interposer 16. In an exemplary embodiment, transistor array kit 120 includes a first substrate 122 including a plurality of sensors 12, and a second substrate 124 including a plurality of transmitters 12, wherein first substrate 122 is interchangeable with second substrate 124. Sensor array kit 120 also includes an electronic device 18, such as but not limited to a signal processor circuit, configured to removably couple to at least one of substrate 14 and interposer 16.

Figure 11:
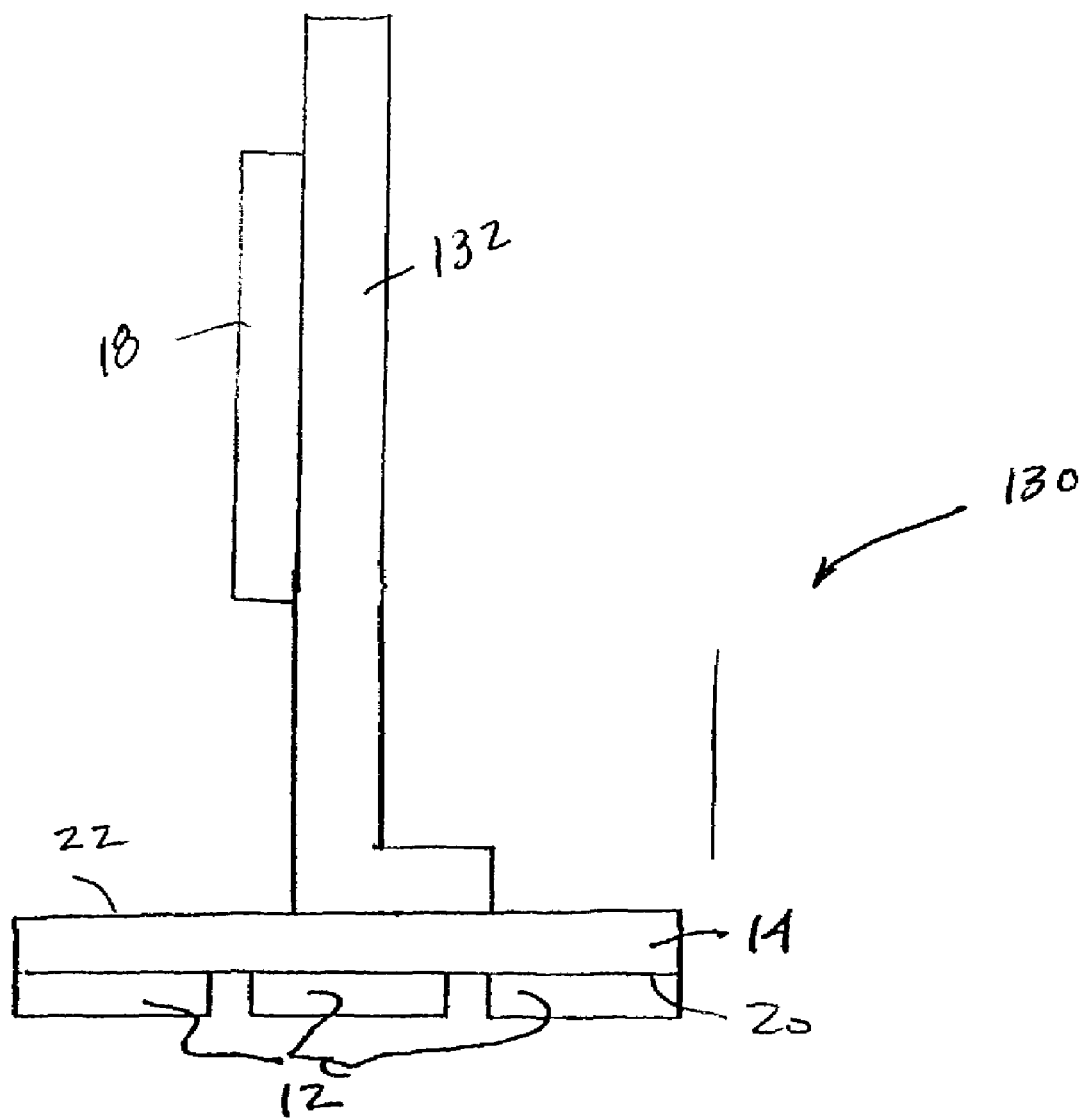
FIG. 11 is a side view of an alternate embodiment of a portion of a tileable sensor array.

FIG. 11 is a side view of an alternate embodiment of a portion of a tileable sensor array 130. In an exemplary embodiment, tileable sensor array 130 includes a plurality of transducers 12 fabricated on a substrate 14. Sensor array 130 also includes a flexible printed circuit board 132 removably coupled to substrate 14 and an electronic device 18. In one embodiment, flexible printed circuit board 132 includes an approximately ninety-degree bend configured to couple to substrate second side 22. In another embodiment, flexible printed circuit board 132 includes a bend between approximately zero-degrees and approximately ninety-degrees such that flexible printed circuit board 132 extends approximately obliquely from substrate second side 22. In use, electronic device 18 is configured to transmit signals to plurality of transducers 12 fabricated on a substrate first side 20, and receive signals from plurality of transducers 12 fabricated on substrate first side 20. For example, sensor array 130 can be configured as a transmitter or a receiver using the desired transducers 12.

In use, a sensor array 100 facilitates configuring a plurality of sensor arrays 130 adjacent to each other such that a larger image area or volume can be imaged. For example, by locating the device I/O pads on the back of a substrate, a plurality of sensor arrays 130 can be butted, side-by-side, in both the x and y axis, to form continuous arrays, tiles, and panels, etc. Further, an electrical contact to sensor arrays 130 can be effected by using a high density electrical interconnect system such as a flexible interconnect, e.g., metal-on-polyimide film, etc., I/O pads attached to the back of sensor array 130 thereby facilitating transmission of signals from the sensor arrays to the system as well as the installation and removal of sensor arrays 130 without interference or impact on adjacent system components.

Further, a high density package including a plurality of signal processors, signal processors, analog-to-digital converters, or other ancillary electronics could be located on, at, or near the sensor 130 to facilitate improving electrical performance and system function. By locating these electrical functions and components in close proximity to the sensor or device arrays, system function and performance may be improved. These improvements result from reduced signal path lengths for component-to-component and component-to-system interconnect as well as a reduction in the number of system interconnects as effected by the ability to multiplex digital signals available following conversion from their analog counterparts detected using the sensor pixels, channels, etc. Additionally, since the electronics are positioned at an angle from the substrate, a greater quantity of electronics can be electrically coupled to the sensor array since the printed circuit board can be increased to any desired length to allow coupling of any desired quantity of electronics. More specifically, the flexible printed circuit board can be fabricated with a surface area greater than the surface area of the substrate.

Additionally, using sensor 10, including electrical contacts located on its back, e.g., a sensor, and an interconnect, e.g., metal-on-polyimide flexible film attached to the substrate I/O pads facilitates increasing a quantity of I/O connections, since device I/O's are often configured either in single, linear, or area pad arrays, with an area array offering the greatest density of I/O connections. For the density of I/O connections effected by area arrays, at fine pitch (less than 1 mm), utilizing a flexible interconnect facilitates achieving a high performance, highly reliable electrical connection. Further, by attaching electronic device 18, at, or near the sensor, additional improvements may be achieved in the areas of electrical and functional performance, reduction of noise, and reduction of system I/O connections. These improvements are realized as a result of reduced interconnect lengths, e.g., the interconnect from sensor to system amplification, and the capacity for signal amplification, processing, conditioning, etc., implemented prior to transmitting the signals to the system, in parallel or serial format. Also, environmental and electrical shielding to protect signals from undesired interference and signal degradation may be included by means of embedding or affixing the appropriate materials, e.g., tungsten, diamond-like-carbon, copper, etc., to the backside of the sensor, metal-on-polyimide film, or miniature packages attached to the interconnect system(s) or included in the sensor system packaging.

Having interconnected and packaged system components to effect a miniature package with a backside I/O connection, as described above, the sensors could then be arranged in two-dimensional arrays. These two dimensional arrays, made possible by the lack of I/O connections situated or located at the device periphery, can be configured to any size or dimension, relative to the quantity and arrangement of rows and columns of individual sensors, thus providing for desired structures compatible with applications in imaging or characterizing desired physical areas or volumes of physical objects, energy fields, etc.

In another implementation, a rigid, semi-rigid, or flexible interposer can be attached to the sensor back or top located I/O connections prior to assembly or attachment of ancillary or system electronics. This interposer may serve to reconfigure, fan-in, or fan-out I/O connections as well as provide shielding, embedded or affixed, and provide a substrate or mounting base for system electronics, components, etc. Furthermore the interposer could be constructed to satisfy desired mechanical or thermal performance needs.

While the invention has been described in terms of various specific embodiments, those skilled in the art will recognize that the invention can be practiced with modification within the spirit and scope of the claims.

What is claimed is:

1. A tileable sensor array comprising:
    a substrate including a front side and a back side;
    a plurality of transducers fabricated on said front side of said substrate, said transducers arranged in a continuous two-dimensional array such that each transducer is butted against at least two adjacent transducers;

a plurality of input/output connections positioned on said back side of said substrate, said input/output connections electrically coupled to said transducers;

at least one electronic device comprising at least one signal processor circuit; and a flexible metal-on-polyimide interposer positioned between and against said substrate and said electronic device, said flexible interposer comprising a multilayer interconnect system configured to electrically connect said transducers and said input/output connections to said electronic device.

2. A tileable sensor array kit comprising:

a two-dimensional transducer array comprising a plurality of transducers oriented such that each transducer is butted against at least two adjacent transducers;

at least one removable signal processor circuit;

a first flexible interposer including a first plurality of input/output connections and a first multilayer interconnect system, said first flexible interposer positioned between said transducer array and said signal processor circuit; and a second flexible interposer including a second plurality of input/output connections substantially identical to said first plurality of input/output connections and a second multilayer interconnect system, said second flexible interposer positioned between said transducer array and said signal processor circuit; circuit, said first multilayer interconnect system configured differently than said second multilayer interconnect system.

3. A tileable sensor array kit in accordance with claim 2 wherein said transducer array comprises an imaging array comprising a plurality of transducers, and said plurality of transducers comprise a plurality of photodiodes.

4. A tileable sensor array kit in accordance with claim 2 wherein said at least one removable signal processor is electrically coupled to said transducer array.

5. A tileable sensor array kit in accordance with claim 2 wherein said first interposer is fabricated from a material comprising at least one of a polyimide, an aramid, a fluorocarbon, and a polyester.

6. A tileable sensor array kit in accordance with claim 2 wherein said removable signal processor circuit comprises a first electrical connector positioned on an edge of said removable signal processor circuit, said first electrical connector configured to electrically couple to a side of said second interposer such that said removable signal processor circuit is substantially perpendicular to said second interposer.

* * * * *